United States Patent
Lee et al.

(10) Patent No.: US 8,528,712 B2
(45) Date of Patent: Sep. 10, 2013

(54) AUTO TRANSMISSION HYDRAULIC PRESSURE CONTROL APPARATUS

(75) Inventors: Joohang Lee, Yongin-si (KR); Hyukjun Lee, Yongin-si (KR); Jongsool Park, Hwaseong-si (KR); Hyunjun Son, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 299 days.

(21) Appl. No.: 12/955,236

(22) Filed: Nov. 29, 2010

(65) Prior Publication Data

US 2012/0073688 A1    Mar. 29, 2012

(30) Foreign Application Priority Data

Sep. 29, 2010  (KR) .................. 10-2010-0094808

(51) Int. Cl.
*F16H 61/00*    (2006.01)
(52) U.S. Cl.
USPC ............ 192/12 C; 192/48.601; 475/119
(58) Field of Classification Search
USPC .............. 192/12 C, 48.601; 475/119, 120, 475/123, 128
See application file for complete search history.

(56) References Cited

U.S. PATENT DOCUMENTS

| | | | |
|---|---|---|---|
| 7,261,662 B2* | 8/2007 | Nozaki et al. | 475/119 |
| 7,621,836 B2* | 11/2009 | Lim | 475/123 |
| 2006/0172856 A1* | 8/2006 | Takagi | 477/127 |
| 2008/0318723 A1* | 12/2008 | Kang et al. | 475/119 |
| 2009/0107796 A1* | 4/2009 | Hong | 192/12 C |
| 2009/0111636 A1 | 4/2009 | Gierer et al. | |
| 2009/0111646 A1* | 4/2009 | Hong | 477/71 |

FOREIGN PATENT DOCUMENTS

| | | |
|---|---|---|
| JP | 2005-163916 A | 6/2005 |
| KR | 10-2008-0022515 A | 3/2008 |
| KR | 10-2008-0107115 A | 12/2008 |
| KR | 10-0879064 B1 | 1/2009 |
| KR | 10-0879067 B1 | 1/2009 |
| KR | 10-2010-0011844 A | 2/2010 |
| KR | 10-0969362 B1 | 7/2010 |

\* cited by examiner

*Primary Examiner* — Richard M. Lorence
(74) *Attorney, Agent, or Firm* — Morgan, Lewis & Bockius LLP (57) ABSTRACT

An auto transmission hydraulic control apparatus may include six friction elements that of which two friction elements operate to achieve a corresponding to each stage by hydraulic pressure, five direct-controlled solenoid valves that individually and directly control hydraulic pressure to four friction elements and equally and directly control hydraulic pressure to the other two friction elements, an on-off solenoid valve converting output state and non-output state of hydraulic pressure, a switch valve in which one side of a valve spool is supplied by a spring to selectively supply hydraulic pressure from one of the direct-controlled solenoid valves, equally and directly controlling the hydraulic pressure supplied to the two friction element, in accordance with whether hydraulic pressure from on-off solenoid valve is applied to the other side thereof, and four fail-safe valves disposed between the direct-controlled solenoid valves and the friction elements to structurally limit available arrangements of the friction elements.

15 Claims, 3 Drawing Sheets

FIG.2

| OPERATIONAL REFERENCE | ON/OFF | C1 | C2 | C3 | C4 | B1 | B2 |
|---|---|---|---|---|---|---|---|
| N | | | | | | | ○ |
| P | | | | | | | ○ |
| 1st | | ○ | | | | | ○ |
| 2nd | | ○ | | | | ○ | |
| 3rd | | ○ | | ○ | | | |
| 4th | | ○ | | | ○ | | |
| 5th | ○ | ○ | ○ | | | | |
| 6th | ○ | | ○ | | ○ | | |
| 7th | ○ | | ○ | ○ | | ○ | |
| 8th | ○ | | ○ | ○ | | | |
| REV | | | | ○ | | | ○ |

FIG.3

| ELECTRIC CONNECTION STATE | ON/OFF [N/H] | C1 [N/L] | C2 & B2 [N/H] | C3 [N/L] | C4 [N/H] | B1 [N/L] |
|---|---|---|---|---|---|---|
| N | ○ | | | | ○ | |
| P | ○ | | | | ○ | |
| $1^{st}$ | ○ | ○ | | | ○ | |
| $2^{nd}$ | ○ | ○ | ○ | | ○ | |
| $3^{rd}$ | ○ | ○ | ○ | | | ○ |
| $4^{th}$ | ○ | ○ | ○ | | ○ | |
| $5^{th}$ | | ○ | | | ○ | |
| $6^{th}$ | | | | ○ | ○ | |
| $7^{th}$ | | | | ○ | ○ | |
| $8^{th}$ | | | | | ○ | ○ |
| REV | ○ | | | ○ | ○ | |

AUTO TRANSMISSION HYDRAULIC PRESSURE CONTROL APPARATUS

CROSS-REFERENCE TO RELATED APPLICATIONS

The present application claims priority to Korean Patent Application Number 10-2010-0094808 filed Sep. 29, 2010, the entire contents of which application is incorporated herein for all purposes by this reference.

BACKGROUND OF THE INVENTION

1. Field of the Invention

The present invention relates to an auto transmission hydraulic pressure control apparatus, and more particularly, to a hydraulic pressure control apparatus for an 8-step auto transmission.

2. Description of Related Art

An auto transmission mounted in vehicles is an apparatus that automatically converts power from a power generator, such as an engine, into torque and the number of revolution which are suitable for the traveling states of the vehicles to allow the vehicles to travel smoothly.

As the gear ratio that the auto transmission can internally implement becomes various, the power from the power generator can be changed to be more suitable for the traveling states of the vehicles, such that it is possible to improve fuel efficiency and power performance of the vehicles.

In order to implement various gear ratios, as described above, it is required to control a plurality of friction elements and accurately and stably controlling the friction elements to achieve stable shifting without shifting impact, and a failsafe function that allows the friction elements to operate in predetermined appropriate arrangements, removes possibility of malfunction due to a breakdown, and makes minimal traveling possible.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an auto transmission hydraulic pressure control apparatus that can implement 8-step stage by controlling six friction elements, allow stable shifting by accurately and stably controlling the friction elements, and provide a failsafe function preventing malfunction of the friction elements in wrong arrangements due to a breakdown, and make minimal traveling possible.

In an aspect of the present invention, the auto transmission hydraulic control apparatus may include six friction elements that of which two friction elements operate to achieve a corresponding to each stage by means of hydraulic pressure, five direct-controlled solenoid valves that individually and directly control hydraulic pressure that may be supplied to four friction elements in the six friction elements and equally and directly control hydraulic pressure that may be supplied to the other two friction elements, an on-off solenoid valve that converts output state and non-output state of hydraulic pressure, a switch valve in which one side of a valve spool may be supplied by a spring and which selectively supplies hydraulic pressure from one of the direct-controlled solenoid valves, which equally and directly control the hydraulic pressure that may be supplied to the two friction element, in accordance with whether hydraulic pressure from the on-off solenoid valve may be applied to the other side thereof, and four fail-safe valves that may be disposed between the direct-controlled solenoid valves and the friction elements to structurally limit available arrangements of the friction elements.

The six friction elements may be a first clutch, a second clutch, a third clutch, a fourth clutch, a first brake, and a second brake, the second clutch and the second brake may be connected to a first direct control solenoid valve to selectively receive hydraulic pressure equally supplied from the first direct control solenoid valve, which may be one of the direct control solenoid valves, by means of the switch valve, and the first clutch, the third clutch, the fourth clutch, and the first brake may be respectively connected with a second direct control solenoid valve, a third direct control solenoid valve, a fourth direct control solenoid valve, and a fifth direct control solenoid valve, which may be the others of the direction control solenoid valves, to sequentially receive hydraulic pressure.

The auto transmission hydraulic control apparatus may include a regulator valve generating line pressure from hydraulic pressure supplied from an oil pump and a manual valve connected to the regulator valve and selectively outputting D-pressure or R-pressure in accordance with selection of a driver by means of the line pressure wherein the first direct control solenoid valve, the second direct control solenoid valve, and the third direct control solenoid valve may be supplied with the line pressure to supply hydraulic pressure to corresponding friction elements by means of the line pressure, and the fourth direct control solenoid valve and the fifth direct control solenoid valve may be supplied with the D pressure to supply hydraulic pressure to corresponding friction elements by means of the D-pressure.

The first direct control solenoid valve and the fourth direct control solenoid valve may be normally high type valves generating the maximum output pressure without control electricity, the second direct control solenoid valve, the third direct control solenoid valve, and the fifth direct control solenoid valve may be normally low type valves not generating output pressure without control electricity, and the on-off solenoid valve may be a normally high type valve.

The switch valve supplies the hydraulic pressure from the first direct control solenoid valve to the second brake by means of a spring while the hydraulic pressure from the on-off solenoid valve may be not supplied, while the switch valve supplies the hydraulic pressure from the first direct control solenoid valve to the second clutch when the hydraulic pressure from the on-off solenoid valve may be supplied.

The switch valve supplies the R-pressure to the second brake, when the hydraulic pressure from the on-off solenoid valve may be supplied.

The switch valve may have a feedback port that feedbacks the hydraulic pressure supplied to the second clutch and presses the valve spool in the same direction as the hydraulic pressure from the on-off solenoid valve to stabilize the operation of the second clutch.

The four failsafe valves may be a C2-failsafe valve disposed in a pipe line for supplying operation pressure from the switch valve to the second clutch to open/close the pipe line, a C1&C3-failsafe valve disposed in a pipe line for supplying operation pressure from second direct control solenoid valve to the first clutch and operation pressure from the third direct control solenoid valve to the third clutch to open/close simultaneously the two pipe lines, a C4-failsafe valve disposed in a pipe line for supplying operation pressure from the fourth direct control solenoid valve to the fourth clutch to open/close the pipe line, and a B1-failsafe valve disposed in a pipe line for supplying operation pressure from the fifth direct control solenoid valve to the first brake to open/close the pipe line.

The C2-failsafe valve may be configured such that the D-pressure may be applied to one side of a valve spool and the operation pressure for the first clutch and the operation pressure for the first brake or the fourth clutch may be applied to the other side with the elastic force of the spring, in order to prevent the operation pressure for the second clutch from being supplied to the second clutch, when the operation pressure for the first clutch and the operation pressure for the first brake or the fourth clutch may be simultaneously supplied.

The C1&C3-failsafe valve may be configured such that the D-pressure may be applied to one side of a valve spool with elastic force of a spring and the pressure from the on-off solenoid valve may be applied to the other side, in order to stop the operation pressure supplied from the second direct control solenoid valve to the first clutch and the operation pressure supplied from the third direct control solenoid valve to the third clutch and supply the R-pressure to the third clutch, when the pressure from the on-off solenoid valve may be applied.

The C4-failsafe valve may be configured such that elastic force of a spring and the D-pressure may be applied to one side of a valve spool and the operation pressure for the third clutch or the operation pressure for the second brake and the operation pressure for fourth clutch may be applied to the other side, in order to stop the operation pressure supplied from the fourth direct control solenoid valve to the fourth clutch, when the operation pressure for the third clutch or the operation pressure for the second brake and the operation pressure for fourth clutch may be simultaneously applied.

The B1-failsafe valve may be configured such that elastic force of a spring and the D-pressure may be applied to one side of a valve spool and the operation pressure for the third clutch or the operation pressure for the second brake, the operation pressure for fourth clutch, and the operation pressure for the first brake may be applied to the other side, in order to stop the operation pressure supplied from the fifth direct control solenoid valve to the first brake, when any two of the operation pressure for the third clutch or the operation pressure for the second brake, the operation pressure for fourth clutch, and the operation pressure for the first brake may be simultaneously applied.

The auto transmission hydraulic control apparatus may further may include a first pressure switch and a second pressure switch which senses the operation pressure supplied to the first clutch and the third clutch may be respectively disposed in the pipe line for supplying the operation pressure for the first clutch from the C1&C3-failsafe valve to the first clutch and the pipe line for supplying the operation pressure for the third clutch from the C1&C3-failsafe valve to the third clutch.

In another aspect of the present invention, the auto transmission hydraulic control apparatus may include a second brake that operates at both N-stage and 1-step of D-stage, a switch valve disposed to continuously supply hydraulic pressure to the second brake without changing the operation during static shifting between the N-stage and the D-stage, a second direct control solenoid valve disposed to directly control hydraulic pressure that may be supplied to a first clutch to operate with the second brake at the 1-step of the D-stage by means of line pressure, a first pressure switch disposed to sense pressure supplied from the second direct control solenoid valve to the first clutch, and a C1&C3-failsafe valve disposed to close a channel for supplying hydraulic pressure from the second direct control solenoid valve to the first clutch, when the first pressure switch senses that an abnormal state where pressure may be supplied to the first clutch at the N-stage or P-stage.

The switch valve continuously supplies hydraulic pressure to the second brake without changing the operation even in static shifting between the N-stage and R-stage, and a third direct control solenoid valve disposed to directly control hydraulic pressure that may be supplied to a third clutch operating with the second brake at the R-stage by means of line pressure, and a second pressure switch disposed to sense the pressure supplied from the third direct control solenoid valve to the third clutch, may be further may included, and the C1&C3-failsafe valve may be disposed to close a channel for supplying hydraulic pressure from the third direct control solenoid valve to the third clutch, when sensing an abnormal state where pressure may be supplied to third clutch at the N-stage or the P-stage, by using the second pressure switch.

According to exemplary embodiment of the present invention, it is possible to implement 8-stage by controlling six friction elements, allow stable shifting by accurately and stably controlling the friction elements, and provide a failsafe function preventing malfunction of the friction elements in wrong arrangements due to a breakdown, and make minimal traveling possible.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
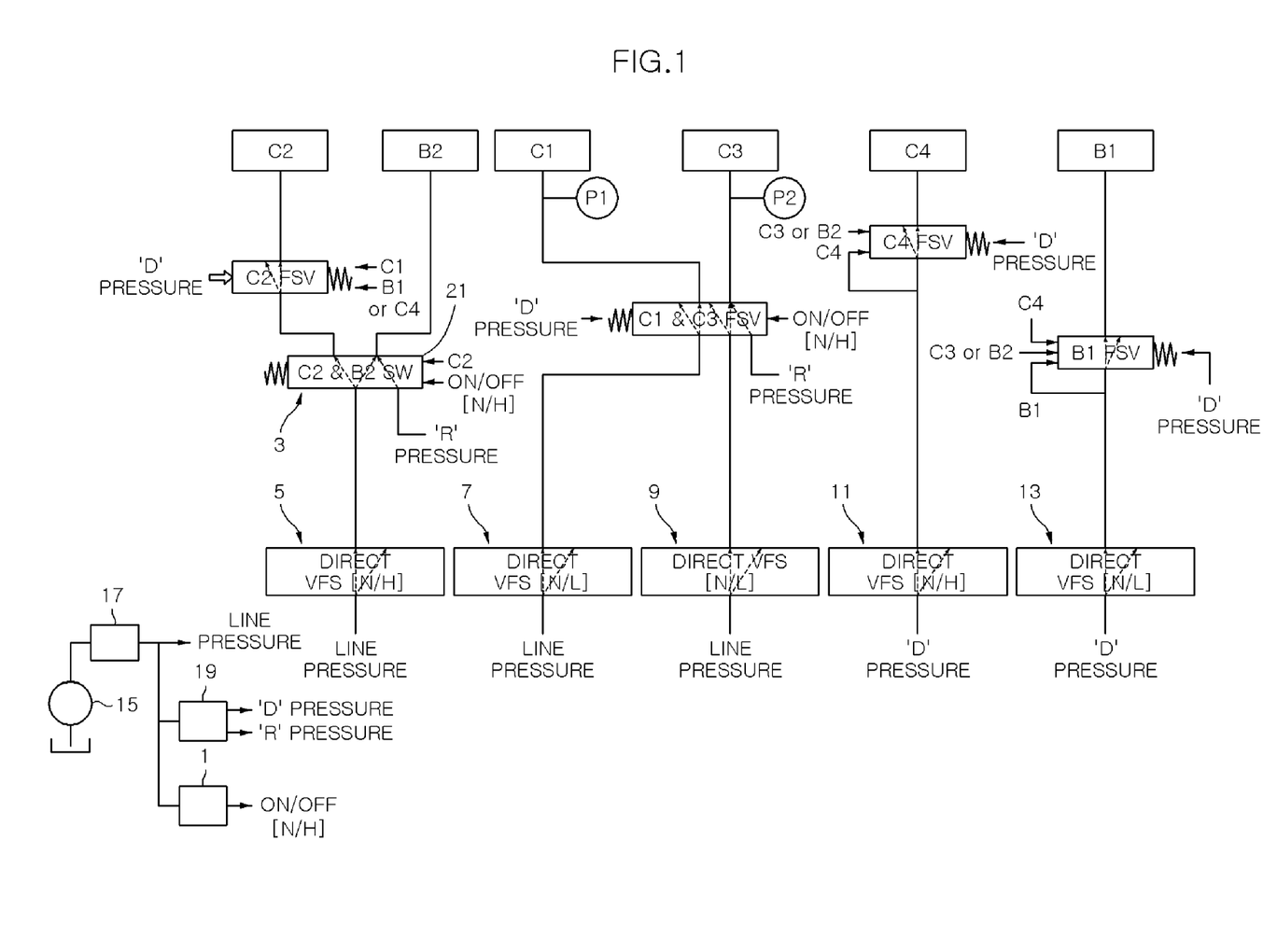
FIG. 1 is a view showing the structure of an auto transmission hydraulic pressure control apparatus according to an exemplary embodiment of the present invention.
Figure 2:
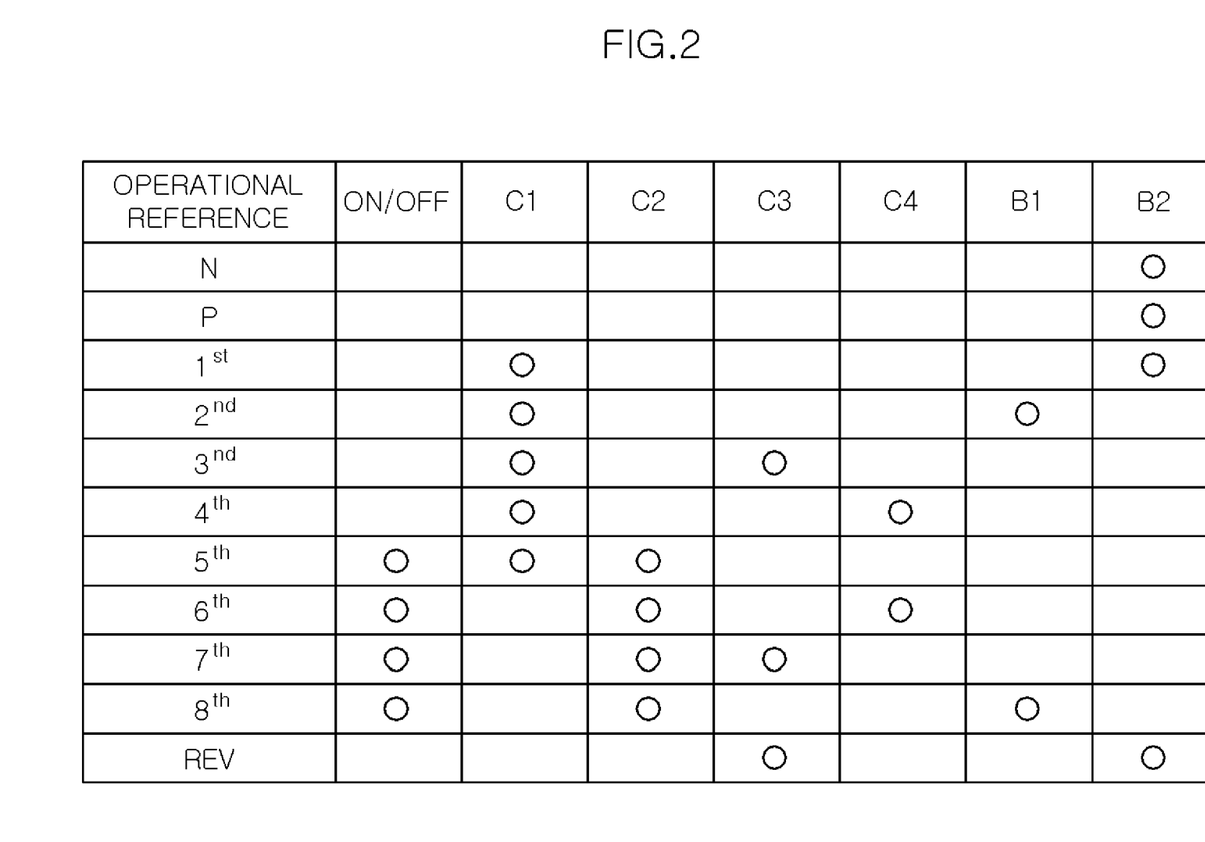
FIG. 2 is a table showing operation modes of operation elements for each stage of the hydraulic pressure control apparatus shown in FIG. 1.
Figure 3:
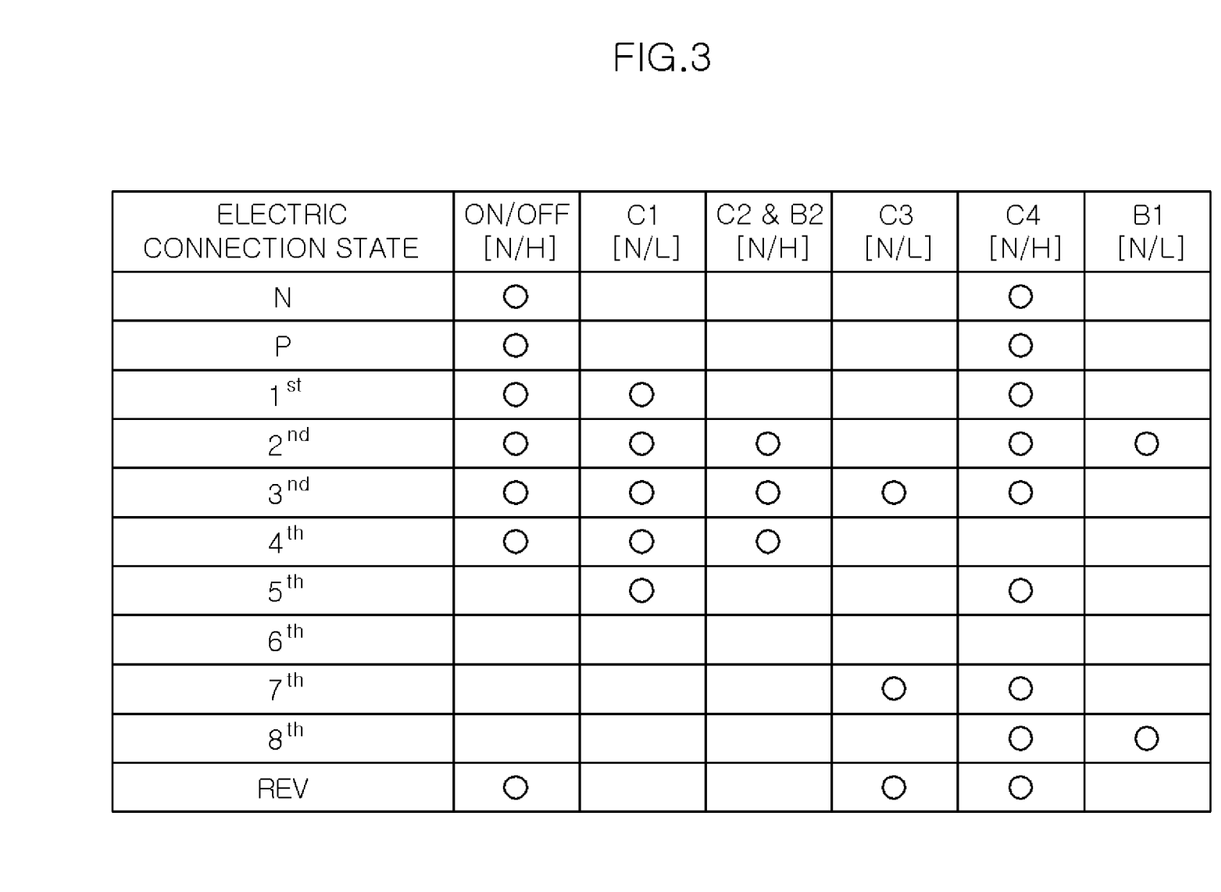
FIG. 3 is a table arranging electric connection states of solenoid valves for implementing the operation modes shown in FIG. 2.

Referring to FIGS. 1 to 3, an auto transmission hydraulic pressure control apparatus according to the exemplary embodiment of the present invention includes six friction elements that of which two friction elements operate to achieve a corresponding to each stage by means of hydraulic pressure, five direct control solenoid valves that individually and directly control hydraulic pressure that is supplied to four friction elements in the friction elements and equally and directly control hydraulic pressure that is supplied to the other two friction elements, an on-off solenoid valve 1 that converts the output state and non-output state of hydraulic pressure, a switch valve 3 in which one side of a valve spool is supplied by a spring and which selectively supplies hydraulic pressure from the direct control solenoid valves, which equally and directly control the hydraulic pressure that is supplied to the two friction element, in accordance with whether hydraulic pressure from on-off solenoid valve is applied to the other side, and four failsafe valves that are disposed between the direct control solenoid valves and the friction elements to structurally limit available arrangements of the friction elements.

Six friction elements are a first clutch C1, a second clutch C2, a third clutch C3, a fourth clutch C4, a first brake B1, and a second brake B2, where second clutch C2 and second brake B2 are connected to selectively receive hydraulic pressure equally supplied from a first direct control solenoid valve 5, which is one of the direct control solenoid valves, by means of switch valve 3, and first clutch C1, third clutch C3, fourth clutch C4, and first brake B1 are respectively connected with a second direct control solenoid valve 7, a third direct control solenoid valve 9, a fourth direct control solenoid valve 11, and a fifth direct control solenoid valve 13, which are the others of the direction control solenoid valves, to sequentially receive hydraulic pressure.

In this configuration, the direct control solenoid valves are parts that directly control and supply hydraulic pressure for corresponding friction elements by performing the functions of the existing pressure control valves, as compared with when common solenoid valves of the related art indirectly control individual pressure control valves to control operation pressure for the friction elements.

Therefore, it is possible to achieve the hydraulic pressure for controlling the friction elements with the direction control solenoid valve, as described above, and it is also possible to make the valve body in a compact and simple structure and improve response.

Meanwhile, the exemplary embodiment of the present invention provides a regulator valve 17 generating line pressure from the hydraulic pressure supplied from an oil pump 15 and a manual valve 19 selectively outputting D-pressure and R-pressure in accordance with selection of a driver by means of the line pressure, and on-off solenoid valve 1 changes the hydraulic pressure output state in accordance with the supply states of control electricity, by means of the line pressure.

First direct control solenoid valve 5, second direct control solenoid valve 7, and third direct control solenoid valve 9 are connected to supply hydraulic pressure to corresponding friction elements by means of the line pressure, and fourth direct control solenoid valve 11 and fifth direct control solenoid valve 13 are connected to supply hydraulic pressure to corresponding friction elements by means of the D-pressure.

First direct control solenoid valve 5 and fourth direct control solenoid valve 11 are normally high type valves generating the maximum output pressure without control electricity, second direct control solenoid valve 7, third direct control solenoid valve 9, and fifth direct control solenoid valve 13 are normally low type valves not generating output pressure without control electricity, and on-off solenoid valve 1 is a normally high type valve.

Switch valve 3 supplies the hydraulic pressure from first direct control solenoid valve 5 to second brake B2 by means of the spring while the hydraulic pressure from on-off solenoid valve 1 is not supplied, while it supplies the hydraulic pressure from first direct control solenoid valve 5 to second clutch C2 when the hydraulic pressure from on-off solenoid valve 1 is supplied.

That is, switch valve 3 is configured such that the hydraulic pressure from on-off solenoid valve 1 can be supplied to the other side, with elastic force of the spring applied to one side of the valve spool, and the valve spool moves and compresses the spring such that the hydraulic pressure generated from first direct control solenoid valve 5 is supplied to second clutch C2 only while the hydraulic pressure from on-off solenoid valve 1 is supplied, and the hydraulic pressure from first direct control solenoid valve 5 is supplied to second brake B2 only while the hydraulic pressure from on-off solenoid valve 1 is not supplied.

In this configuration, since on-off solenoid valve 1 is a normally high type valve, it makes a state in which operation pressure is supplied to second clutch C2 by supplying hydraulic pressure to switch valve 3 when the control electricity is not supplied.

Further, switch valve 3 is equipped with a feedback port 21 that feedbacks the hydraulic pressure supplied to second clutch C2 and presses the valve spool in the same direction as the hydraulic pressure from on-off solenoid valve 1 to stabilize the operation of second clutch C2.

Meanwhile, switch valve 3 supplies the R-pressure to second brake B2, when the hydraulic pressure from on-off solenoid valve 1 is supplied, which is for implementing a rear stage by power-off in the failsafe function, which is described below.

In the exemplary embodiment, the four failsafe valves are a C2-failsafe valve C2FSV disposed in the pipe line for supplying operation pressure from switch valve 3 to second clutch C2 to open/close the pipe line, a C1&C3-failsafe valve C1&C3FSV disposed in the pipe line for supplying operation pressure from second direct control solenoid valve to first clutch C1 and operation pressure from third direct control solenoid valve 9 to third clutch C3 to open/close simultaneously the two pipe lines, a C4-failsafe valve C4FSV disposed in the pipe line for supplying operation pressure from fourth direct control solenoid valve 11 to fourth clutch C4 to open/close the pipe line, and a B1-failsafe valve B1FSV disposed in the pipe line for supplying operation pressure from fifth direct control solenoid valve 13 to first brake B1 to open/close the pipe line.

C2-failsafe valve C2FSV is configured such that the D-pressure is applied to one side of the valve spool and the operation pressure for first clutch C1 and the operation pressure for first brake B1 or fourth clutch C4 is applied to the other side with the elastic force of the spring, in order to prevent the operation pressure for second clutch C2 from being supplied to second clutch C2, when the operation pressure for first clutch C1 and the operation pressure for first brake B1 or fourth clutch C4 are simultaneously supplied.

C1&C3-failsafe valve C1&C3FSV is configured such that the D-pressure is applied to one side of the valve spool with the elastic force of the spring and the pressure from on-off solenoid valve 1 is applied to the other side, in order to stop the operation pressure supplied from second direct control solenoid valve 7 to first clutch C1 and the operation pressure supplied from third direct control solenoid valve 9 to third clutch C3 and supply the R-pressure to third clutch C3, when the pressure from on-off solenoid valve 1 is applied.

C4-failsafe valve C4FSV is configured such that the elastic force of the spring and the D-pressure are applied to one side of the valve spool and the operation pressure for third clutch C3 or the operation pressure for second brake B2 and the operation pressure for fourth clutch C4 are applied to the other side, in order to stop the operation pressure supplied from fourth direct control solenoid valve 11 to fourth clutch C4, when the operation pressure for third clutch C3 or the operation pressure for second brake B2 and the operation pressure for fourth clutch C4 are simultaneously applied.

B1-failsafe valve B1FSV is configured such that the elastic force of the spring and the D-pressure are applied to one side of the valve spool and the operation pressure for third clutch C3 or the operation pressure for second brake B2, the operation pressure for fourth clutch C4, and the operation pressure for first brake B1 are applied to the other side, in order to stop the operation pressure supplied from fifth direct control solenoid valve 13 to first brake B1, when any two of the operation pressure for third clutch C3 or the operation pressure for second brake B2, the operation pressure for fourth clutch C4, and the operation pressure for first brake B1 are simultaneously applied.

For reference, the operation pressure for first brake B1 or fourth clutch C4 supplied to C2-failsafe valve C2FSV is formed to be able to receive all of the operation pressures supplied to first brake B1 and fourth clutch C4, in which the operation pressures are formed and supplied by a divert valve that can selectively output any one applied operation pressure of the operation pressures, and the operation pressure for third clutch C3 or second brake B2 supplied to C4-failsafe valve C4FSV and B1-failsafe valve B1FSV is also formed and supplied in the same principle by the divert valve.

A first pressure switch P1 and a second pressure switch P2 which can sense the operation pressure supplied to first clutch C1 and third clutch C3 are respectively disposed in the pipe line for supplying the operation pressure for first clutch C1 from C1&C3-failsafe valve C1&C3FSV to first clutch C1 and the pipe line for supplying the operation pressure for third clutch C3 to third clutch C3.

First pressure switch P1 and second pressure switch P2 have an additional function for ascertain whether abnormal operations are performed, by generating and supplying electric signals for the operations of first clutch C1 and third clutch C3 to a controller, in addition to the operations of the failsafe valves.

The operations of the failsafe valves are described hereafter.

First, in the failsafe function when the power for the hydraulic pressure control apparatus is turned off, manual valve 19 is fixed to the 6-step when the D-stage is selected, implements the R-stage when the R-stage is selected, and stops any friction elements except for the second brake to maintain minimal starting and stopping states at the N-stage and the P-stage.

It is described first when manual valve 19 is at the D-stage and the power is turned off. The hydraulic pressure from the normally high type of on-off solenoid valve 1 is supplied to the valve spool of switch valve 3 and the hydraulic pressure passing through the normally high type of first direct control solenoid valve 5 is supplied toward second clutch C2 and the D-pressure is supplied to the valve spool of C2-failsafe valve, such that operation pressure is supplied to second clutch C2.

Further, since the D-pressure is also applied to the valve spool of C4-failsafe valve C4FSV, the hydraulic pressure from the normally high type of fourth direct control solenoid valve 11 is supplied to fourth clutch C4 through C4-failsafe valve C4FSV.

Therefore, second clutch C2 and fourth clutch C4 that are the operation element of the 6-step stage shown in FIG. 2, thereby implementing the 6-step stage.

Next, when manual valve 19 selects the R-stage and the power is turned off, third clutch C3 and second brake B2 should operate to implement the R-stage, such that the hydraulic pressure from on-off solenoid valve 1 is applied to switch valve 3 and the R-pressure is supplied to second brake B2 while the hydraulic pressure from on-off solenoid valve 1 is applied to one side of the valve spool of C1&C3-failsafe valve C1&C3FSV and the D-pressure is not applied to the other side, therefore, the R-pressure is supplied to third clutch C3.

In this operation, the hydraulic pressure supplied to second clutch C2 through switch valve 3 is stopped such that the valve spool is moved by the spring and operation pressure is not supplied to second clutch C2, because the D-pressure is not applied to C2-failsafe valve C2FSV, and fourth clutch C4 and first brake B1 are positioned such that fourth direct control solenoid valve 11 and fifth direct control solenoid valve 13 receive the D-pressure, but the R-pressure is formed and the D-pressure is not formed in manual valve 19, such that they are not operated.

Next, the N-state or the P-state should be kept when the power is turned off at the N-stage or the P-stage. Therefore, hydraulic pressure is not supplied to second clutch C2 by C2-failsafe valve C2FSV where the D-pressure is not supplied, operation pressure is not supplied to first clutch C1 and third clutch C3 because second direct control solenoid valve 7 and third direct control solenoid valve 9 are both the normally low type valves and C1&C3-failsafe valve C1&C3FSV receiving hydraulic pressure from the normally high type of on-off solenoid valve 1 closes the channel connected from second direct control solenoid valve 7 and third direct control solenoid valve 9 to first clutch C1 and third clutch C3, such that first clutch C1 and third clutch C3 are never operated, even if second direct control solenoid valve 7 and third direct control solenoid valve 9 make malfunction.

Further, fourth clutch C4 and first brake B1 are obviously not operated, because the D-pressure is not supplied to fourth direct control solenoid valve 11 and fifth direct control solenoid valve 13.

Meanwhile, it is required to prevent the friction elements from operating in inappropriate arrangements, which are not intended, when the hydraulic pressure control system of an automatic transmission normally operates. Therefore, C2-failsafe valve C2FSV stops the operation pressure for second clutch C2, when manual valve 19 selects the D-stage, the operation pressure for first clutch C1 is applied, and any one of the operation pressure for the first brake and fourth clutch C4 is applied.

Referring to FIG. 2 to describe this operation, second clutch C2 should not operate in the 2-step state where first clutch C1 operates and first brake B1 operates and the 4-step state where first clutch C1 operates and fourth clutch C4 operates, which is structurally implemented by the above operation.

Meanwhile, C4-failsafe valve C4FSV prevents the operation pressure for fourth clutch C4 from being transmitted to fourth clutch C4, when the operation pressure for third clutch C3 or second brake B2 is applied and the operation pressure for fourth clutch C4 is applied, and prevents the operation pressure for fourth clutch C4 is transmitted to fourth clutch C4, when the operation pressure for third clutch C3 or the operation pressure for second brake B2 is supplied while the operation pressure for fourth clutch C4 is applied. As a result, fourth clutch C4 is prevented from operating simultaneously with third clutch C3 or second brake B2.

That is, referring to FIG. 2, fourth clutch C4 operates only at the 4-step and 6-step, while third clutch C3 and second brake B2 are not provided with a mode where they can operate with fourth clutch C4, which is structurally implemented by the above operation.

Meanwhile, B1-failsafe valve B1FSV stops the pressure supplied to first brake B1 such that first brake B1 does not operate with fourth clutch C4, third clutch C3, or second brake B2, when operation pressure is supplied toward first brake B1 and the operation pressure for fourth clutch C4, the operation pressure for third clutch C3, or the operation pressure for second brake B2 is supplied.

That is, referring to FIG. 2, first brake B1 should operate only at the 2-step and the 8-step while fourth clutch C4, third clutch C3, or second brake B2 should not operate, which is structurally implemented by the above operation.

Meanwhile, seeing the exemplary embodiment of the present invention in another angle, the present invention includes: second brake B2 that operates at both N-stage and 1-step of D-stage, switch valve 3 disposed to continuously supply hydraulic pressure to second brake B2 without changing the operation during static shifting between the N-stage and the D-stage, second direct control solenoid valve 7 disposed to directly control hydraulic pressure that is supplied to first clutch C1 to operate with second brake B2 at the 1-step of D-stage by means of line pressure, first pressure switch P1 disposed to sense pressure supplied from second direct control solenoid valve 7 to first clutch C1, and C1&C3-failsafe valve C1&C3FSV disposed to close the channel for supplying hydraulic pressure from second direct control solenoid valve 7 to first clutch C1, when first pressure switch P1 senses that an abnormal state where pressure is supplied to first clutch C1 at the N-stage or the P-stage.

Transmissions are generally configured such that the D-pressure is supplied to newly operating friction elements, when shifting from the N-stage to the D-stage, such that the transmissions operate only when the driver shifts to the D-stage, thereby implementing the failsafe function. That is, D-pressure that is supplied to the friction elements is not generated in the manual valve unless the driver selects the D-stage, such that it is possible to physically prevent an abnormal stage where the vehicle can move forward at the N-stage, without difficulty.

However, according to the configuration of the related art, D-pressure is generated at the manual valve by the static shifting operation of the driver and then supplied to the friction elements, such that this configuration is disadvantageous in terms of response in comparison to directly supplying line pressure to the friction elements. Further, the pressure supplied from the manual valve is temporarily removed in shifting from the D-stage to the N-stage, such that it is difficult to disengage the friction elements, therefore, it is required to install an accumulator to ensure the controllability, or specifically complement the structure or the control logic.

However, the present invention improves control response by allowing second direct control solenoid valve 7 to directly generate and supply the hydraulic pressure, which is supplied to first clutch C1 operating with second brake B2 at the 1-step of D-stage, from line pressure.

Further, in an abnormal stage where pressure is continuously supplied to first clutch C1 at the N-stage, the controller that have sensed the abnormal state, using first pressure switch P1, controls on-off solenoid valve 1 such that C1&C3-failsafe valve C1&C3FSV closes the channel for supplying hydraulic pressure from second direct control solenoid valve 7 to first clutch C1, thereby providing the same failsafe function.

Further, the present invention does not need a specific device, such as an accumulator, because it is possible to stably control removal of hydraulic pressure of first clutch C1 while continuously receiving line pressure from second direct control solenoid valve 7, when static shifting from the D-stage to the N-stage.

According to the exemplary embodiment of the present invention, static shifting between the N-stage to the R-stage can be achieve in the same way.

That is, in the exemplary embodiment of the present invention, second brake B2 operates at all of the N-stage, the 1-step of D-stage, and the R-stage, switch valve 3 can continuously supply hydraulic pressure to second brake B2 without changing the operation even in static shifting between the N-stage and the R-stage, and further has third direct control solenoid valve 9 disposed to directly control hydraulic pressure that is supplied to third clutch C3 operating with second brake B2 at the R-stage by means of line pressure, second pressure switch P2 is disposed to sense the pressure supplied from third direct control solenoid valve 9 to third clutch C3, and C1&C3-failsafe valve C1&C3FSV is disposed to close the channel for supplying hydraulic pressure from third direct control solenoid valve 9 to third clutch C3, when sensing an abnormal state where pressure is supplied to third clutch C3 at the N-stage or the P-stage, by using second pressure switch P2.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic transmission hydraulic control apparatus comprising:
   six friction elements of which two friction elements operate to achieve a stage by means of hydraulic pressure;
   five direct-controlled solenoid valves that individually and directly control hydraulic pressure that is supplied to four friction elements in the six friction elements and equally and directly control hydraulic pressure that is supplied to two friction elements;
   an on-off solenoid valve that converts output state and non-output state of hydraulic pressure;
   a switch valve in which one side of a valve spool is provided with a spring and which selectively supplies hydraulic pressure from one of the direct-controlled solenoid valves, which equally and directly control the hydraulic pressure, in accordance with whether hydraulic pressure from the on-off solenoid valve is applied to the other side thereof; and
   four fail-safe valves that are disposed between the direct-controlled solenoid valves and the six friction elements to structurally limit available arrangements of the six friction elements.

2. The automatic transmission hydraulic control apparatus as defined in claim 1, wherein the six friction elements are a first clutch, a second clutch, a third clutch, a fourth clutch, a first brake, and a second brake, the second clutch and the second brake are connected to a first direct control solenoid valve to selectively receive hydraulic pressure equally supplied from the first direct control solenoid valve, which is one of the direct control solenoid valves, by means of the switch valve, and the first clutch, the third clutch, the fourth clutch, and the first brake are respectively connected with a second direct control solenoid valve, a third direct control solenoid valve, a fourth direct control solenoid valve, and a fifth direct control solenoid valve, which are the others of the direction control solenoid valves, to sequentially receive hydraulic pressure.

3. The automatic transmission hydraulic control apparatus as defined in claim 2, comprising a regulator valve generating line pressure from hydraulic pressure supplied from an oil pump and a manual valve connected to the regulator valve and selectively outputting D-pressure or R-pressure in accordance with selection of a driver by means of the line pressure, wherein the first direct control solenoid valve, the second direct control solenoid valve, and the third direct control solenoid valve are supplied with the line pressure to supply hydraulic pressure to corresponding friction elements by means of the line pressure, and the fourth direct control solenoid valve and the fifth direct control solenoid valve are supplied with the D pressure to supply hydraulic pressure to corresponding friction elements by means of the D-pressure.

4. The automatic transmission hydraulic control apparatus as defined in claim 3, wherein the first direct control solenoid valve and the fourth direct control solenoid valve are normally high type valves generating the maximum output pressure without control electricity, the second direct control solenoid valve, the third direct control solenoid valve, and the fifth direct control solenoid valve are normally low type valves not generating output pressure without control electricity, and the on-off solenoid valve is a normally high type valve.

5. The automatic transmission hydraulic control apparatus as defined in claim 4, wherein the switch valve supplies the hydraulic pressure from the first direct control solenoid valve to the second brake when the switch valve opens by means of a spring while the hydraulic pressure from the on-off solenoid valve is not supplied, while the switch valve supplies the hydraulic pressure from the first direct control solenoid valve to the second clutch when the hydraulic pressure from the on-off solenoid valve is supplied.

6. The automatic transmission hydraulic control apparatus as defined in claim 5, wherein the switch valve supplies the R-pressure to the second brake, when the hydraulic pressure from the on-off solenoid valve is supplied.

7. The automatic transmission hydraulic control apparatus as defined in claim 6, wherein the switch valve has a feedback port that feedbacks the hydraulic pressure supplied to the second clutch and presses the valve spool in the same direction as the hydraulic pressure from the on-off solenoid valve to stabilize the operation of the second clutch.

8. The automatic transmission hydraulic control apparatus as defined in claim 7, wherein the four failsafe valves are a C2-failsafe valve disposed in a first pipe line for supplying operation pressure from the switch valve to the second clutch to open/close the first pipe line, a C1&C3-failsafe valve disposed in second and third pipe lines for supplying operation pressure from second direct control solenoid valve to the first clutch and operation pressure from the third direct control solenoid valve to the third clutch to open/close simultaneously the second and third pipe lines, a C4-failsafe valve disposed in a fourth pipe line for supplying operation pressure from the fourth direct control solenoid valve to the fourth clutch to open/close the fourth pipe line, and a B1-failsafe valve disposed in a fifth pipe line for supplying operation pressure from the fifth direct control solenoid valve to the first brake to open/close the fifth pipe line.

9. The automatic transmission hydraulic control apparatus as defined in claim 8, wherein the C2-failsafe valve is configured such that the D-pressure is applied to one side of a valve spool and the operation pressure for the first clutch and the operation pressure for the first brake or the fourth clutch is applied to the other side with the elastic force of a spring, in order to prevent the operation pressure for the second clutch from being supplied to the second clutch, when the operation pressure for the first clutch and the operation pressure for the first brake or the fourth clutch are simultaneously supplied.

10. The automatic transmission hydraulic control apparatus as defined in claim 9, wherein the C1&C3-failsafe valve is configured such that the D-pressure is applied to one side of a valve spool with elastic force of a spring and the pressure from the on-off solenoid valve is applied to the other side, in order to stop the operation pressure supplied from the second direct control solenoid valve to the first clutch and the operation pressure supplied from the third direct control solenoid valve to the third clutch and supply the R-pressure to the third clutch, when the pressure from the on-off solenoid valve is applied.

11. The automatic transmission hydraulic control apparatus as defined in claim 10, wherein the C4-failsafe valve is configured such that elastic force of a spring and the D-pressure are applied to one side of a valve spool and the operation pressure for the third clutch or the operation pressure for the second brake and the operation pressure for fourth clutch are applied to the other side, in order to stop the operation pressure supplied from the fourth direct control solenoid valve to the fourth clutch, when the operation pressure for the third clutch or the operation pressure for the second brake and the operation pressure for fourth clutch are simultaneously applied.

12. The automatic transmission hydraulic control apparatus as defined in claim 11, wherein the B1-failsafe valve is configured such that elastic force of a spring and the D-pressure are applied to one side of a valve spool and the operation pressure for the third clutch or the operation pressure for the second brake, the operation pressure for fourth clutch, and the operation pressure for the first brake are applied to the other side, in order to stop the operation pressure supplied from the fifth direct control solenoid valve to the first brake, when any two of the operation pressure for the third clutch or the operation pressure for the second brake, the operation pressure for fourth clutch, and the operation pressure for the first brake are simultaneously applied.

13. The automatic transmission hydraulic control apparatus as defined in claim 12, further comprising a first pressure switch and a second pressure switch which senses the operation pressure supplied to the first clutch and the third clutch are respectively disposed in the pipe line for supplying the operation pressure for the first clutch from the C1&C3-failsafe valve to the first clutch and the pipe line for supplying the operation pressure for the third clutch from the C1&C3-failsafe valve to the third clutch.

14. An automatic transmission hydraulic control apparatus comprising:
- a second brake that operates at both N-stage and 1-step of D-stage;
- a switch valve disposed to continuously supply hydraulic pressure to the second brake without changing the operation during static shifting between the N-stage and the D-stage;
- a second direct control solenoid valve disposed to directly control hydraulic pressure that is supplied to a first clutch to operate with the second brake at the 1-step of the D-stage by means of line pressure;
- a first pressure switch disposed to sense pressure supplied from the second direct control solenoid valve to the first clutch; and
- a C1&C3-failsafe valve disposed to close a channel for supplying hydraulic pressure from the second direct control solenoid valve to the first clutch, when the first pressure switch senses an abnormal state where pressure is supplied to the first clutch at the N-stage or P-stage.

15. The automatic transmission hydraulic control apparatus as defined in claim 14, wherein the switch valve continuously supplies hydraulic pressure to the second brake without changing the operation even in static shifting between the N-stage and R-stage, and
- a third direct control solenoid valve disposed to directly control hydraulic pressure that is supplied to a third clutch operating with the second brake at the R-stage by means of line pressure, and a second pressure switch disposed to sense the pressure supplied from the third direct control solenoid valve to the third clutch, are further included, and
- the C1&C3-failsafe valve is disposed to close a channel for supplying hydraulic pressure from the third direct control solenoid valve to the third clutch, when sensing an abnormal state where pressure is supplied to third clutch at the N-stage or the P-stage, by using the second pressure switch.

* * * * *